United States Patent
Ramamurthy

(10) Patent No.: US 9,284,932 B2
(45) Date of Patent: Mar. 15, 2016

(54) MOUNTING STRUCTURE FOR FUEL INJECTOR

(75) Inventor: Dhyana Ramamurthy, Novi, MI (US)

(73) Assignee: Denso International America, Inc., Southfield, MI (US)

( * ) Notice: Subject to any disclaimer, the term of this patent is extended or adjusted under 35 U.S.C. 154(b) by 764 days.

(21) Appl. No.: 12/731,635

(22) Filed: Mar. 25, 2010

(65) Prior Publication Data

US 2011/0232608 A1  Sep. 29, 2011

(51) Int. Cl.
*F02M 61/14* (2006.01)
*F16F 15/02* (2006.01)

(52) U.S. Cl.
CPC ............... *F02M 61/14* (2013.01); *F16F 15/02* (2013.01)

(58) Field of Classification Search
USPC .......... 123/467–472; 277/309–313, 590–598, 277/605
See application file for complete search history.

(56) References Cited

U.S. PATENT DOCUMENTS

| | | | | | |
|---|---|---|---|---|---|
| 2,208,482 | A | * | 7/1940 | Victor | 277/569 |
| 4,626,003 | A | * | 12/1986 | Williams et al. | 285/98 |
| 4,649,884 | A | * | 3/1987 | Tuckey | 123/457 |
| 5,329,901 | A | * | 7/1994 | Onishi | 123/254 |
| 5,368,314 | A | * | 11/1994 | Victor et al. | 277/400 |
| 5,797,604 | A | * | 8/1998 | Inagaki et al. | 277/618 |
| 6,481,421 | B1 | | 11/2002 | Reiter | |
| 6,736,111 | B2 | * | 5/2004 | Braun et al. | 123/456 |
| 6,848,425 | B2 | | 2/2005 | Raimann | |
| 6,899,087 | B2 | | 5/2005 | Norgauer | |
| 7,032,905 | B2 | * | 4/2006 | Mullally | 277/647 |
| 7,258,108 | B2 | * | 8/2007 | Haraga | 123/468 |
| 7,293,550 | B2 | | 11/2007 | Beardmore | |
| 7,373,925 | B2 | | 5/2008 | Reiter et al. | |
| 7,444,992 | B2 | | 11/2008 | Ricci | |
| 7,823,565 | B2 | * | 11/2010 | Chern et al. | 123/470 |
| 2002/0170987 | A1 | * | 11/2002 | Aoki et al. | 239/585.4 |
| 2003/0080556 | A1 | * | 5/2003 | Kilgore | 285/189 |
| 2004/0080115 | A1 | | 4/2004 | Tsuchiya et al. | |
| 2006/0157031 | A1 | * | 7/2006 | Kaishio | 123/456 |
| 2008/0229697 | A1 | * | 9/2008 | Bosman et al. | 52/588.1 |
| 2009/0127796 | A1 | * | 5/2009 | Kanzaki et al. | 277/562 |
| 2009/0255187 | A1 | * | 10/2009 | Alexander et al. | 49/477.1 |
| 2010/0018502 | A1 | * | 1/2010 | Fischetti et al. | 123/470 |
| 2010/0052259 | A1 | * | 3/2010 | Lewis | 277/312 |
| 2010/0108010 | A1 | * | 5/2010 | Matsuda et al. | 123/184.56 |
| 2010/0175668 | A1 | * | 7/2010 | Chern et al. | 123/470 |

OTHER PUBLICATIONS

Office Action issued Jan. 2, 2015 in corresponding DE Application No. 10 2011 001 443.8 (with English translation).

* cited by examiner

*Primary Examiner* — John Kwon
*Assistant Examiner* — Johnny H Hoang
(74) *Attorney, Agent, or Firm* — Harness, Dickey & Pierce, P.L.C.

(57) ABSTRACT

A fuel injector mounting structure may employ a flat bottom, a first (e.g. exterior) vertical wall that meets flat bottom, a second (e.g. interior) vertical wall that meets flat bottom, and a top wall. The top wall may define a flat surface transitioning into a curved surface. The top wall, flat bottom, first vertical wall and second vertical wall may be in the shape of a circular ring with a center hole through the center of the ring. An engine cylinder head may contact the bottom wall and a fuel injector may contact the curved surface of the top wall. Fuel injector and flat surface of top wall may define an air gap between them to inhibit vibration transmission from the fuel injector into the cylinder head. A powder metal material or an elastomer may occupy a cavity within the circular ring.

13 Claims, 2 Drawing Sheets

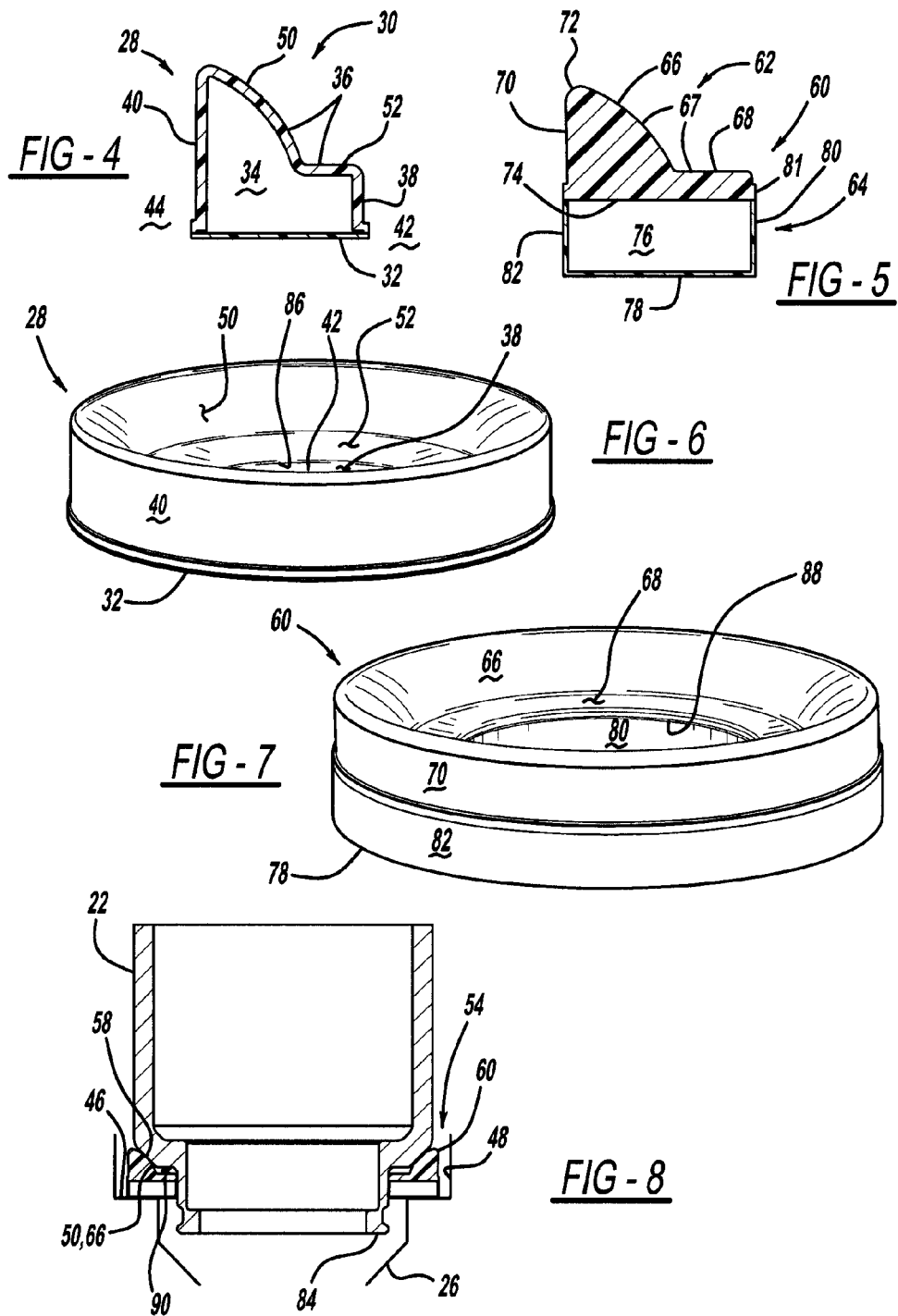

US 9,284,932 B2

MOUNTING STRUCTURE FOR FUEL INJECTOR

FIELD

The present disclosure relates to a mounting structure for use in a fuel injection system.

BACKGROUND

This section provides background information related to the present disclosure which is not necessarily prior art. Those involved in the design and manufacture of modern vehicles strive to minimize or eliminate sources of noise, vibration and harshness ("NVH") in the various components of the vehicles. One source of NVH in a modern vehicle, such as an automobile, is the direct injection fuel injection system, which supplies fuel to the combustion cylinders of the internal combustion engine. During delivery of liquid fuel to a combustion cylinder of an engine, individual fuel injectors typically transmit a high frequency vibration to the metal engine cylinder head. High frequency vibrations resulting from operation of the fuel injectors propagate through the metal cylinder head and into surrounding air and are heard as a constant and repetitive "tapping," "clicking" or "ticking" by people inside or in close proximity to the vehicle.

What is needed then is a device that reduces or eliminates audible noises emanating from a fuel injection system of an internal combustion engine.

SUMMARY

This section provides a general summary of the disclosure, and is not a comprehensive disclosure of its full scope or all of its features. A fuel injector mounting structure for placement between and in contact with a fuel injector and a cylinder head may employ a flat bottom, a first (e.g. exterior) vertical wall that may meet the flat bottom at ninety degrees, a second (e.g. interior) vertical wall that may meet the flat bottom at ninety degrees, and a top wall. The top wall may be opposite the entire flat bottom, that is, the top wall may be located directly across (i.e. opposite) from the entire flat bottom. The top wall and flat bottom do not extend past the surface of the first (exterior) wall or the surface of the second (interior) vertical wall. The top wall may contoured and define a flat surface and a curved or non-linear surface, with the flat surface transitioning into the curved surface. The top wall, flat bottom, first vertical wall and second vertical wall may be in the shape of a circular ring with a hole through the center of the ring to permit a tip of a fuel injector to pass through the hole. The circular ring may define an enclosed, hollow interior cavity bounded by the above-mentioned walls and surfaces.

The bottom wall may be a separate piece that is attachable to the first vertical wall and the second vertical wall by press-fitting or welding. The first vertical wall may face an exterior of the circular ring and may be taller (i.e. higher, wider or have greater depth) than the second vertical wall. The second vertical wall may face an interior of the circular ring and form part of a boundary of the through hole. An engine cylinder head may contact the bottom wall and a fuel injector may contact the curved or non-linear surface of the top wall. The fuel injector and the flat surface of the top wall may define an air gap between them to prevent or lessen vibration transmission from the fuel injector into the cylinder head and surrounding air. A powder material, such as aluminum powder, silicon dioxide or an elastomer may occupy the cavity.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 4 is a cross-sectional view of an injector alignment ring according to a first embodiment;

FIG. 5 is a cross-sectional view of an injector alignment ring according to a second embodiment;

FIG. 6 is a perspective view of the injector alignment ring of FIG. 4;

FIG. 7 is a perspective view of the injector alignment ring of FIG. 5; and

FIG. 8 is a cross-sectional view of a fuel injector seated upon an injector alignment ring.

Corresponding reference numerals indicate corresponding parts throughout the several views of the drawings.

DETAILED DESCRIPTION

Example embodiments will now be described more fully with reference to the accompanying drawings. With reference to FIGS. 1-8, description of a mounting structure for a fuel injector of a fuel delivery system for an internal combustion engine will be described.

Figure 1:
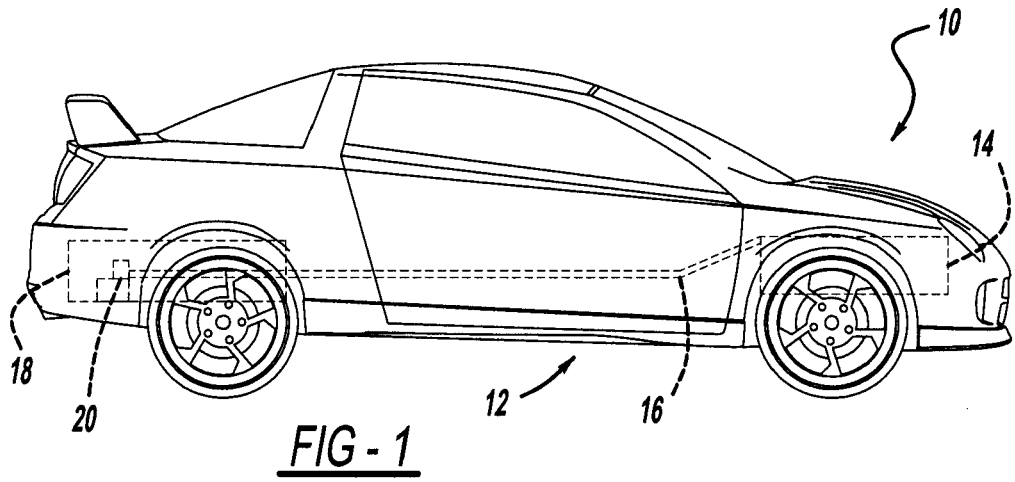
FIG. 1 is a perspective view of a vehicle depicting a fuel system in phantom.
Figure 2:
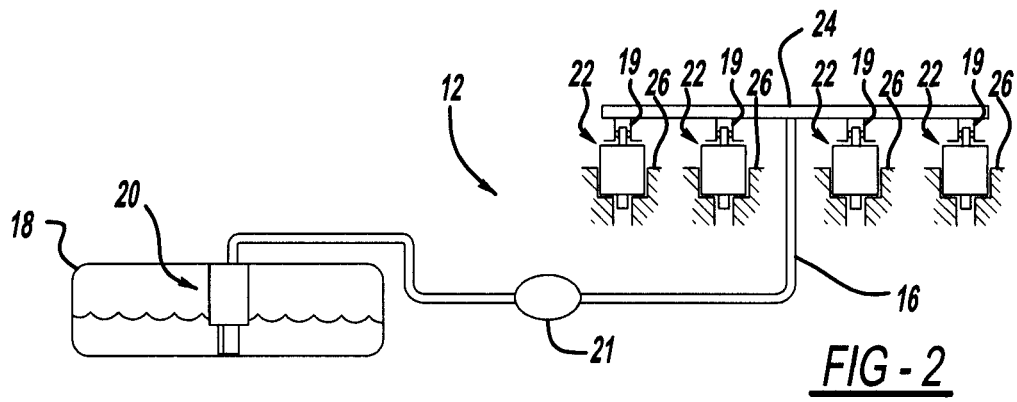
FIG. 2 is a perspective view of a vehicle fuel supply system depicting fuel injectors.

With reference first including FIGS. 1 and 2, a vehicle 10 may be equipped with a fuel system 12, which may be a part of or system of an engine 14, a fuel line 16, a fuel tank 18, a fuel pump module 20 and direct injection fuel injectors 22 attached to a fuel rail 24, also known as a "common rail." Fuel pump module 20 resides within fuel tank 18 and is normally submerged in or surrounded by varying amounts of liquid fuel within fuel tank 18 when fuel tank 18 possesses liquid fuel. A fuel pump within fuel pump module 20 pumps fuel to engine 14 through fuel line 16. When liquid fuel is delivered to engine 14 from fuel tank 18, the liquid fuel passes through fuel line 16 and into a fuel rail 24. Before entering fuel rail 24, the liquid fuel may be pressurized by a fuel injection pump 21, which may be driven by a cam, to a fuel pressure suitable for injecting into a combustion cylinder under a combustion cylinder head 26 of engine 14. Upon the liquid fuel reaching fuel rail 24, the liquid fuel passes into individual fuel injectors 22, which may be mountable into a cup 19 attached to fuel rail 24, and may then spray or inject the fuel into an intake manifold or a cylinder head 26 of internal combustion engine 14. Alternatively, in direct injection, fuel may be sprayed directly into a combustion chamber of an engine.

Figure 3:
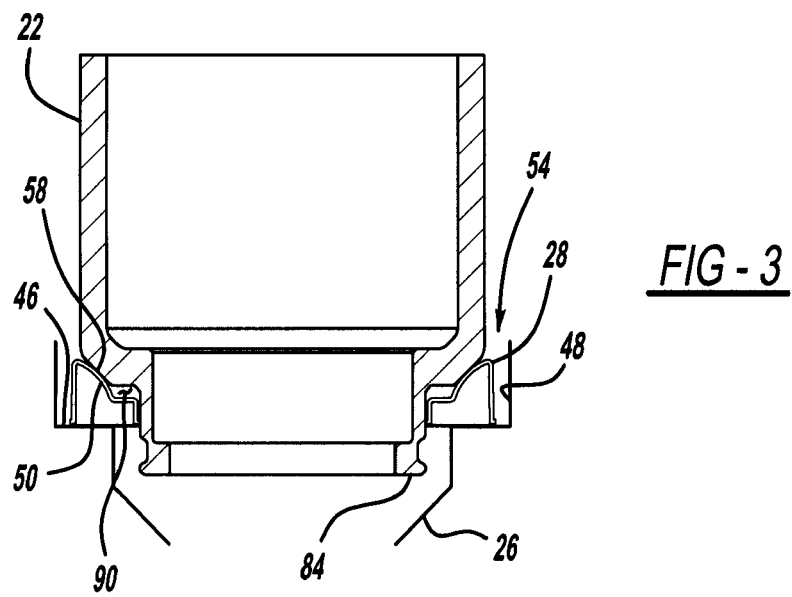
FIG. 3 is a cross-sectional view of a fuel injector seated upon a injector alignment ring.

Continuing, FIG. 3 depicts a first embodiment of the teachings in which fuel injector 22 may reside against an injector alignment ring 28, which may reside against cylinder head 26 or other structure that abuts against cylinder head 26. Injector alignment ring 28 may be a multi-piece component and, for example, exhibit an upper portion 30 and a lower portion 32, which is also called a cap, flat bottom, or bottom wall. Upper portion 30 may be a stamped metal component that together with lower portion 32, defines a non-solid, hollow interior 34. That is, hollow interior 34 is defined or formed by its surrounding walls, which will be presented in more detail later. Upper portion 30 is called an upper portion because it generally faces upward, or away from Earth's surface, when installed in a typical internal combustion engine in a vehicle. Upper portion 30 and lower portion 32 may be stamped from a variety of metals and in a variety of thicknesses to accommodate any given combination of fuel injector 22 and cylinder head 26. Lower portion 32 may be welded or pressed onto upper portion 30 and define one side of hollow interior 34. Upper portion 30 generally defines three walls (top wall 36, interior wall 38 and exterior wall 40 of the bounded volume that is hollow interior 34. Top wall 36, interior wall 38 and exterior wall 40 are so called because top wall 36 generally defines a top of injector alignment ring 28 and is positioned as a top wall when injector alignment ring 28 is positioned in cylinder head 26. Interior wall 38 is so called because interior wall 38 faces or bounds an interior volume 42 or through hole 86 of injector alignment ring 28, and exterior wall 40 is so called because exterior wall 40 faces or bounds an exterior space 44 of injector alignment ring 28. Additionally, lower portion 32 is so called because it faces toward a bottom of a vehicle 10 or engine 14 when installed within a cylinder head 26. Thus, lower portion 32 generally bounds one side of hollow interior 34 while upper portion 30 generally bounds three sides of hollow interior 34.

When injector alignment ring 28 is installed or positioned in its in-use position within cylinder head 26, lower portion 32 may contact a surface 46, which may be a flat surface or flat upper surface, of cylinder head 26. However, in an actual assembly, a gap may exist between cylinder head 26 and exterior wall 40 of injector alignment ring 28. In FIG. 6, top wall 36 (surfaces 50, 52) of upper portion 30 of injector alignment ring 28 may be a non-linear wall in its entirety; however, portions of top wall 36 may be linear in cross-section, as depicted in FIG. 4. For instance, top wall 36 may have a curved or non-linear surface 50 with a radius of curvature that is greater than zero which then transitions into a linear wall 52. In the cross-section of FIG. 4, one end of curved surface 50 meets straight, exterior wall 40, while one end of linear wall 52 meets straight, interior wall 38.

With reference to FIG. 3, when injector alignment ring 28 is installed within a cylinder head cavity 54 of cylinder head 26, lower portion 32 of injector alignment ring 28 may reside upon flat surface 46 of cylinder head 26 and surface 58 of injector 22 may reside against curved surface 50 of injector alignment ring 28. Surface 58 of injector 22 may be a flat surface or a curved or non-linear surface. Vibration caused by of operation of injector 22 may be transmitted through contact, which may be in a complete circular ring, between surface 58 of injector 22 and curved surface 50 of injector alignment ring 28. To dampen vibration and lessen overall NVH transmitted into cylinder head 26, injector alignment ring 28 may define a hollow interior 34. Noise from fuel injector 22 while operating may be heard by people seated within vehicle 10, or standing outside of vehicle 10. Moreover, vibration from operating fuel injector 22 may be felt by seated passengers within vehicle 10. Thus, by decreasing the mass and overall density (mass per unit volume) of injector alignment ring 28 by creating hollow interior 34, NVH transmitted to cylinder head 26 may be reduced when injector 22 operates since vibration may have to transmit from a top wall of the injector alignment ring 28 to the atmosphere of the hollow interior 34 before being transmitted again to a bottom wall of the injector alignment ring 28.

Injector alignment ring 28 absorbs vibrations from injector operation that may be transmitted from injector 22 through injector alignment ring 28 into cylinder head 26 and which then may subsequently be heard and felt by occupants or bystanders of vehicle 10. Various structures of Injector alignment ring 28 may absorb vibration. Accordingly, instead of injector alignment ring 28 having an air-filled hollow interior 34, hollow interior 34 may be filled with a suitable powder, such as compacted or loose aluminum powder, silica or silicon dioxide, such as compacted or loose silicon dioxide, or a solid or powdered elastomer, such as a naturally occurring elastomer, such as natural rubber, or one that is produced synthetically, regardless, such elastomer will be able to withstand engine compartment temperatures. Regardless, such above-mentioned powders and elastomers will possess energy absorbing characteristics, such as vibration and sound wave absorbing characteristics. FIG. 6 depicts a perspective view of injector alignment ring 28. As depicted, injector alignment ring 28 may be a toroid or toroidal.

In another embodiment of the teachings, FIG. 5 depicts injector alignment ring 60 possessing an upper portion 62 and a lower portion 64, which may define a hollow volume or cavity. As depicted in cross-section in FIG. 5, upper portion 62 may be a solid metal and exhibit a curved or non-linear surface 66 that transitions into a horizontal, flat surface 68. Additionally, curved surface 66 may have an uppermost end 72 that transitions into vertical wall 70. A bottom surface 74 may be a flat surface and provide a bottom boundary of upper portion 62. Upper portion 62 of injector alignment ring 60 may be stamped, machined or cast from a solid material, such as a stainless steel material or a non-stainless carbon steel material. Other metal materials may be utilized for injector alignment rings 28, 60.

With continued reference to FIG. 5, injector alignment ring 60 may also employ a lower portion 64, which may contain a hollow interior 76. Lower portion 64 may be made from a metal stamping and employ a bottom wall 78 and two vertical walls 80, 82. Vertical walls 80, 82 may form ninety degree angles with bottom wall 78 and also be welded or press fit onto upper portion 62. More specifically, vertical walls 80, 82 may be pressed around an outside of upper portion 62, or vertical walls 80, 82 may be welded to upper portion 62, such as to bottom wall 74, for instance. Lower portion 64 may have a hollow interior 76 immediately after being manufactured as a separate piece, but before being attached or connected to upper portion 62, hollow interior 76 may be filled with aluminum powder, such as compacted or loose aluminum powder, silicon dioxide, such as compacted or loose silicon dioxide, or an elastomer, such as a naturally occurring elastomer, such as natural rubber, or one that is produced synthetically. Regardless, materials used to fill hollow interior 76 will be capable of withstanding engine compartment temperatures and other environmental factors of an engine compartment. Optionally, hollow interior 76 may remain unfilled after assembly to upper portion 62. Regardless, such above-mentioned powders and elastomers will possess energy absorbing characteristics, such as vibration and noise absorbing characteristics. FIG. 7 depicts a perspective view of injector alignment ring 60, which may be a toroid or toroidal.

When installed, injector alignment ring 28, 60 may reside upon cylinder head 26, respectively depicted in FIGS. 3 and 8. One injector alignment ring 28 may be installed for each injector or fuel injection point of engine 14 and may simply rest against or contact engine cylinder head 26. Stated differently, an injector alignment ring 28, 60 may be assembled to an injector and then such injector may be may be assembled to fuel rail 24. Fuel rail 24 may then be assembled to engine head 26. Injector tip 84 passes through center hole 86, 88 of injector alignment ring 28. When installed, as depicted in FIGS. 3 and 8, injector alignment ring 28, 60 may also reside upon cylinder head 26 with injector tip 84 passing through a respective center hole 86, 88 of injector alignment ring 28, 60. Regardless of which injector alignment ring 28, 60 is installed into cylinder head 26, a gap 90 may exist between a wall of fuel injector 22 and injector alignment ring 28, 60. More specifically, gap 90 may exist between a point or surface of contact between wall of injector 22 and injector alignment ring 28, 60 and that location where injector 22 passes through center hole 86, 88 of injector alignment ring 28, 60. In other words, gap 90 may exist between fuel injector 22 and injector alignment ring 28, 60. Because gap 90 is not a point of contact between fuel injector 22 and cylinder head 26, vibration from operation of fuel injector 22 will have limited opportunity to pass into cylinder head 26 and subsequently be heard or felt by a person within, or surrounding, vehicle 10.

Thus, a fuel injector mounting structure may employ lower portion 32, first (e.g. exterior) vertical wall 40 that meets lower portion 32 (i.e. a wall) at, or approximately at, ninety degrees, second (e.g. interior) vertical wall 38 that meets lower portion 32 at, or approximately at, ninety degrees, and top wall 36. Top wall 36 may be a non-linear piece and be opposite an entirety of lower portion 32, that is, top wall 36 may be located directly across (i.e. opposite) from the entire lower portion 32. The top wall 36 and lower portion 32 may or may not extend past the surfaces of the first (exterior) wall 40 or the second (interior) vertical wall 38. The top wall 36 may define a flat surface 52 and a curved surface 50, with the flat surface 52 transitioning into the curved surface 50. The top wall 36, lower portion 32, first vertical wall 40 and second vertical wall 38 may be in the shape of a circular ring with a center hole 86 through the center of the ring. The circular ring may define a hollow cavity 34 bounded by the above-mentioned walls 32, 36, 38, 40.

The lower portion 32 may be a separate piece that is attachable to the first vertical wall 40 and the second vertical wall 38 by press-fitting or welding. The first vertical wall 40 may face an exterior space 44 of the circular ring and may be taller (i.e. higher) than the second vertical wall 38, such as in cross-section. The second vertical wall 38 may face an interior space 42 (i.e. center hole 86) of the circular ring. The fuel injector mounting structure may further employ an engine cylinder head 26, which may contact the lower portion 32 and the first vertical wall 40, and a fuel injector 22, which may contact the curved surface 50 of the top wall 36. Fuel injector 22 and flat surface 52 of top wall 36 may define an air gap 90 between them to prevent or lessen vibration transmission from fuel injector 22 into engine cylinder head 26. A powder material, such as aluminum powder, silicon dioxide or an elastomer may occupy cavity 34.

In another arrangement, a fuel injector mounting structure may employ a solid (i.e. non-hollow) upper portion 62 and a hollow, non-solid lower portion 64. Lower portion 64 may further employ a lower portion bottom wall 78, a lower portion first vertical wall 82, and a lower portion second vertical wall 80. Solid upper portion 62 and lower portion 64 may be connected together by welding, press-fitting or suitable joining method. Solid upper portion 62 may exhibit a flat bottom surface 74, a first vertical surface 70 that meets flat bottom surface 74 at, or approximately at, ninety degrees, a second vertical surface 81 that meets the flat bottom surface 74 at, or approximately at, ninety degrees, and a top surface 67 that is opposite the entire flat bottom surface 74. Top surface 67 may define a curved surface 66 that transitions into a flat surface 68. Lower portion bottom wall 78, lower portion first vertical wall 82, lower portion second vertical wall 80 and solid portion flat bottom surface 74 of solid upper portion 62 may define a cavity 76 (e.g. a hollow volume). Solid upper portion 62 may be a solid circular ring (e.g. a toroid) that defines a center through hole 88. Cavity 76 may contain a powder material or an elastomer. The structure may include an engine cylinder head 26, which contacts lower portion bottom wall 78 and lower portion first vertical wall 82 and optionally, first vertical surface 70. A fuel injector 22 may contact curved surface 66 of top surface 67. Moreover, fuel injector 22 and flat surface 68 of top surface 67 may define an air gap 90 therebetween. A powdered metal or elastomer may occupy cavity 76.

In yet another arrangement, a fuel injector mounting structure may employ a circular ring, which may employ a solid, non-hollow upper portion 62 and a hollow bottom cavity 76. Upper portion 62 may further employ a flat bottom surface 74, an exterior facing vertical wall 70 that meets flat bottom surface 74 at approximately ninety degrees, and an interior facing vertical wall 81 that meets flat bottom surface 74 at approximately ninety degrees. Top wall 67 may define a flat surface 68 that transitions into a curved surface 66. Lower portion 64 may further employ a lower portion bottom wall 78, a lower portion first vertical wall 82, and a lower portion second vertical wall 80. Solid upper portion 62, or at least flat bottom surface 74 of the upper portion 62, and lower portion 64 may define a hollow cavity 76. Exterior facing vertical wall (wall 70 and wall 82) of circular ring 60, which faces away from an interior of the circular ring, may be taller (i.e. wider or deeper) than interior facing vertical wall (wall 81 and wall 80), which faces an interior of circular ring 60.

The foregoing description of the embodiments has been provided for purposes of illustration and description. It is not intended to be exhaustive or to limit the invention. Accordingly, the above describe teachings may be utilized in a gasoline engine, diesel engine, or an engine of any fuel that utilizes fuel injection. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

Spatially relative terms, such as "inner," "outer," "beneath", "below", "lower", "above", "upper" and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:
1. A fuel injector mounting structure in combination with a fuel injector and an engine cylinder head, the fuel injector mounting structure comprising:
   a flat bottom wall;
   a first vertical wall that meets the flat bottom wall at ninety degrees;

a second vertical wall that meets the flat bottom wall at ninety degrees; and a top wall that is opposite the flat bottom wall, the top wall defining a flat surface and a non-linear surface, wherein, prior to being in combination with the fuel injector and the engine cylinder head, the top wall, the flat bottom wall, the first vertical wall and the second vertical wall define an enclosed cavity, the enclosed cavity is disposed between the fuel injector and the engine cylinder head when in combination with the fuel injector and the engine cylinder;

wherein:

the flat bottom wall is a separate piece that is fixedly attached to the first vertical wall and the second vertical wall;

when in combination with the fuel injector and the engine cylinder head, the top wall and the second vertical wall define an enclosed air gap with the fuel injector;

the first vertical wall is taller than the second vertical wall, the first vertical wall faces an exterior of a circular ring, and the second vertical wall faces an interior of the circular ring;

the engine cylinder head contacts the flat bottom wall;

the fuel injector contacts the non-linear surface of the to wall; and the top wall, the flat bottom wall, the first vertical wall and the second vertical wall are shaped in a circular ring within which the cavity resides.

2. The combination of claim 1, wherein the circular ring is toroid in shape.

3. The combination of claim 1, wherein a powder material occupies the cavity.

4. The combination of claim 3, wherein the powder material is one of powder aluminum and silicon dioxide.

5. The combination of claim 1, wherein an elastomer occupies the cavity.

6. A fuel injector mounting structure in combination with a fuel injector and an engine cylinder head, the fuel injector mounting structure comprising:

a solid upper portion defining a flat bottom surface, the solid upper portion further comprising a first vertical surface that meets the flat bottom surface, a second vertical surface that meets the flat bottom surface, and a top surface that is opposite the flat bottom surface, the top surface defining a non-linear surface that transitions into a linear surface; and a lower portion including:

a lower portion bottom wall, a lower portion first vertical wall that meets the lower portion bottom wall at ninety degrees, and a lower portion second vertical wall that meets the lower portion bottom wall at ninety degrees, wherein the solid upper portion and the lower portion are fixedly connected together, wherein the lower portion bottom wall, the lower portion first vertical wall, the lower portion second vertical wall and the flat bottom surface of the solid upper portion define an enclosed cavity;

wherein:

the first vertical surface is taller than the second vertical surface, the first vertical surface faces an exterior of a circular ring, and the second vertical surface faces an interior of the circular ring;

the engine cylinder head contacts the lower portion bottom wall;

the fuel injector contacts the non-linear surface of the top surface; and the flat bottom surface of the solid upper portion, the lower portion bottom wall, the lower portion first vertical wall, and the lower portion second vertical wall are shaped in a circular ring within which the cavity resides.

7. The combination of claim 6, wherein the solid upper portion is a solid circular ring that defines a center through hole.

8. The combination of claim 7, wherein the cavity contains one of a powder material and an elastomer.

9. The combination of claim 6, wherein the fuel injector and the linear surface of the top surface define an air gap therebetween.

10. The combination of claim 9, wherein the mounting structure is toroid in shape.

11. The combination of claim 9, wherein an elastomer occupies the cavity.

12. The combination of claim 6, wherein a powder material occupies the enclosed cavity, the powder material is one of aluminum and silicon dioxide.

13. A fuel injector mounting structure in combination with a fuel injector and an engine cylinder head, the fuel injector mounting structure comprising:

a circular ring comprising:

a solid, non-hollow top portion in direct contact with the fuel injector; and a hollow bottom portion in direct contact with the engine cylinder head, wherein the solid, non-hollow top portion and the hollow bottom portion are fixedly connected, and a closed cavity is defined by only the solid, non-hollow top portion and walls of the hollow bottom portion;

the solid, non-hollow top portion further includes:

a flat bottom wall;

an exterior facing vertical wall that meets the flat bottom wall at ninety degrees;

an interior facing vertical wall that meets the flat bottom wall at ninety degrees; and a top wall defining a linear surface and a non-linear surface the hollow bottom portion further includes a lower portion bottom wall, a lower portion first vertical wall, and a lower portion second vertical wall;

wherein:

the closed cavity of the hollow bottom portion is defined by the flat bottom wall of the top portion, the lower portion bottom wall, the lower portion first vertical wall, and the lower portion second vertical wall;

the exterior facing vertical wall is taller than the interior facing vertical wall, the exterior facing vertical wall faces an exterior of the circular ring and the interior facing vertical wall faces an interior of the circular ring;

a powder material is included in the closed cavity; and the powder material is one of powder aluminum and silicon dioxide.

* * * * *

UNITED STATES PATENT AND TRADEMARK OFFICE
CERTIFICATE OF CORRECTION

PATENT NO. : 9,284,932 B2  
APPLICATION NO. : 12/731635  
DATED : March 15, 2016  
INVENTOR(S) : Dhyana Ramamurthy Page 1 of 1

It is certified that error appears in the above-identified patent and that said Letters Patent is hereby corrected as shown below:

In the Claims

At column 7, claim number 1, line number 25, delete "to" and insert --top--.

Signed and Sealed this  
Seventh Day of June, 2016

Michelle K. Lee  
*Director of the United States Patent and Trademark Office*